United States Patent [19]
Groelz et al.

[11] 3,934,819
[45] Jan. 27, 1976

[54] ANTI-RUN AHEAD SYSTEM FOR TRAVELING HOSE PULL SPRINKLERS

[75] Inventors: Jay C. Groelz; John W. Heinzman, both of Phillips, Nebr.

[73] Assignee: Heinzman Engineering, Inc., Grand Island, Nebr.

[22] Filed: Jan. 8, 1975

[21] Appl. No.: 539,526

[52] U.S. Cl......... 239/189; 180/105 R; 242/86.5 R; 239/191
[51] Int. Cl.² ........................................ B05B 3/18
[58] Field of Search ........... 239/188, 189, 190, 191; 242/54, 86.5 R; 137/344; 180/1 R, 105 R; 74/242.8, 242.9

[56] References Cited
UNITED STATES PATENTS

| | | | |
|---|---|---|---|
| 3,628,731 | 12/1971 | Phillips | 239/189 |
| 3,684,178 | 8/1972 | Friedlander | 239/189 |
| 3,771,720 | 11/1973 | Courtright | 239/189 |
| 3,848,805 | 11/1974 | Courtright | 239/189 |

Primary Examiner—James B. Marbert
Assistant Examiner—Michael Mar
Attorney, Agent, or Firm—Clarence A. O'Brien; Harvey B. Jacobson

[57] ABSTRACT

On a mobile agricultural sprinkler of the type provided with a wheeled chassis and a rotatable winding member about which one end of a flexible tension member is wound and further including coupling structure thereon for coupling to a high pressure water hose as well as a fluid motor having a fluid inlet coupled to the coupling structure and a rotary mechanical output member, flexible torque transfer structure is provided for drivingly coupling the rotatable output member to the winding drum and is flexive under the transmission of torque from the output member through the torque transfer structure to the winding member. Wheel brake structure is also provided and operative to releasably brake at least one of the supportive wheels of the irrigation device. Also, the wheel brake structure includes fluid pressure actuatable operator structure shiftable between active and inactive positions and a fluid pressure line extends from the coupler structure to the brake operator for actuation thereof. A control valve is disposed in the fluid pressure line and includes an operator sensitive to flexure of the torque transfer structure for shifting the control valve operator between open and closed positions in response to variations in flexure of the torque transfer structure. In this manner, in the event the mobile irrigation device tends to overrun the drive therefor through the torque transfer structure the brake structure will be applied.

9 Claims, 4 Drawing Figures

ANTI-RUN AHEAD SYSTEM FOR TRAVELING HOSE PULL SPRINKLERS

BACKGROUND OF THE INVENTION

Various forms of mobile irrigation devices have irrigation water supplied thereto through a special rubber hose which is dragged through the field behind the irrigation structure. The irrigation structure device is equipped with a water-driven motor driving a winding member upon which one end of a cable is wound and the other end of the cable extends forwardly of the irrigation structure and is suitably anchored whereby the mobile irrigation device is pulled over the ground. However, some mobile irrigation devices of this type utilize large capacity high pressure irrigation guns which oscillate and are rearwardly directed and at the start of a run of the mobile irrigation device along a field the reactionary forces applied to the mobile sprinkler as a result of the rearward discharge of irrigation water therefrom tends to overcome rolling resistance of the wheels of the irrigation device and the frictional drag of the initial short length of hose being dragged behind the irrigation device with the result that the irrigation device tends to move along the field at a rate faster than that which would be determined by the cable being wound on the winding member or winch. The tendency of the mobile irrigation device to "run ahead" of the cable propelling apparatus thereof causes slack in the cable and the cable may wind incorrectly or unevenly on the winding member or drum causing cable and/or winch damage. Further, the front steerable wheels of a mobile irrigation device of this type are controlled by the cable along which the device is pulled and a slack condition in the cable inevitably causes erratic directional movement of the mobile irrigation device. Further, erratic rate of advance of the mobile irrigation device caused by a "run ahead" condition will cause irrigation water delivered thereby to be unevenly applied to the field being irrigated.

In order to prevent the aforementioned "run ahead" condition various attempts have been made at providing mobile irrigation devices with automatically operable wheel brake means actuatable in response to a slack cable condition. Some of these previously designed devices as well as other irrigation devices including some of the general structural features in the instant invention are disclosed in U.S. Pat. Nos. 3,477,643, 3,489,352, 3,684,178 and 3,771,720.

BRIEF DESCRIPTION OF THE INVENTION

The mobile irrigation device of the instant invention is equipped with a chain drive for driving the winding drum for the cable along which the irrigation device pulls itself. The wheels of the irrigation device are provided with fluid pressure actuated brakes and tension sensing structure is provided for sensing the taut reach of the driving chain and operably connected to a control valve interposed in a high pressure fluid line extending from the high pressure irrigation water supply to the brake actuator. Thus, should the tension of the taut reach of the driving chain be reduced below a predetermined minimum the brakes of the mobile irrigation device are applied to prevent a "run ahead" condition.

The main object of this invention is to provide an automatic braking structure for a mobile irrigation device of the type which pulls itself along a cable and constructed in a manner whereby any tendency of the irrigation device to "run ahead" of the cable pulling mechanism thereof will be immediately offset by application of the wheel brakes of the mobile irrigation device.

Another object of this invention, in accordance with the immediately preceding object, is to provide the wheel brakes of the irrigation device with a fluid pressure actuator whereby the brakes of the mobile irrigation device will be retained inoperative at all times until such time as the irrigation water discharge system of the mobile irrigation device is operably connected to a suitable source of high pressure irrigation water, thereby ensuring that the brakes of the mobile irrigation device will be automatically rendered inoperable whenever the mobile irrigation device is disconnected from its source of high pressure irrigation water.

Yet another object of this invention is to provide an apparatus in accordance with the preceding objects and constructed in a manner whereby it may be readily added to existing mobile irrigation devices.

A final object of this invention to be specifically enumerated herein is to provide an apparatus in accordance with the preceding objects and which will conform to conventional forms of manufacture, be of simple construction and automatic in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
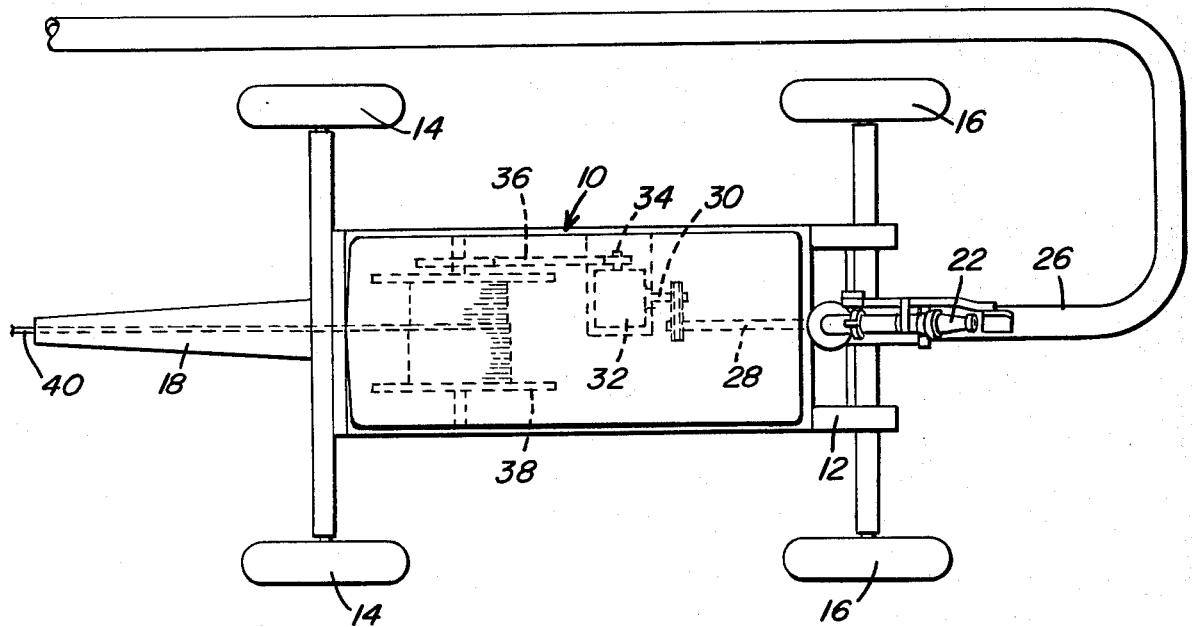
FIG. 1 is a top plan view of a mobile irrigation device constructed in accordance with the present invention.
Figure 2:
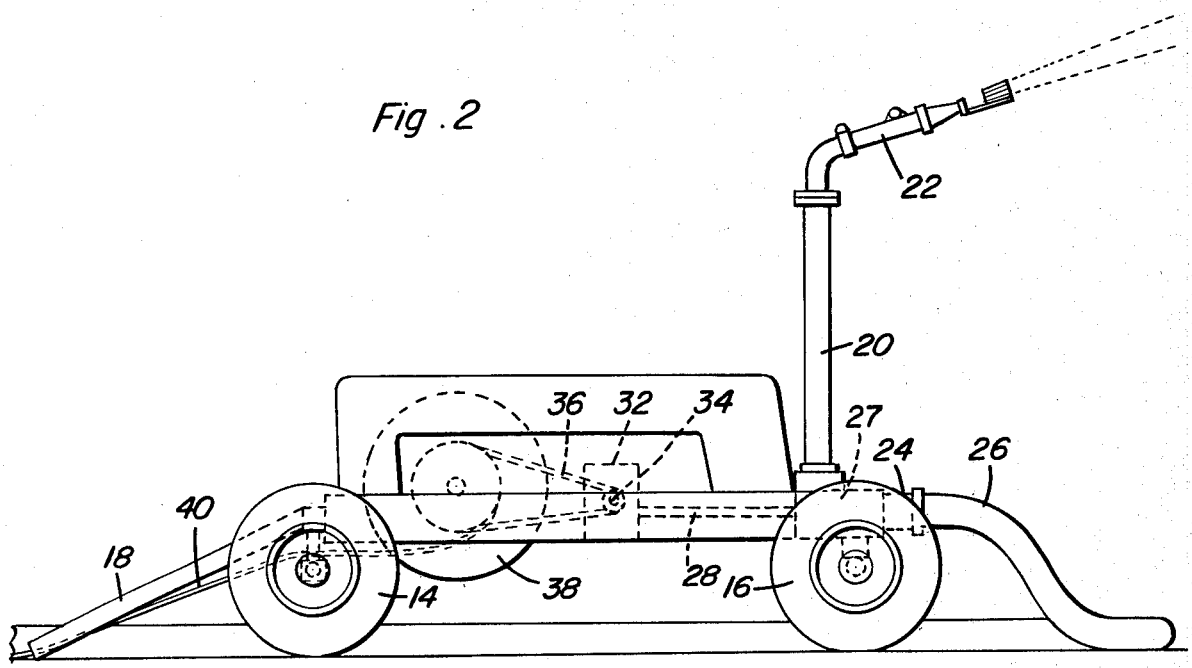
FIG. 2 is a side elevational view of the mobile irrigation device.

Referring now more specifically to the drawings, the numeral 10 generally designates a conventional form of mobile irrigation device including a chassis 12 equipped with front and rear ground-engaging support wheels 14 and 16. The front wheels 14 are of the dirigible type and are operably connected to a horizontally swingable forwardly projecting tongue 18 in any convenient manner, the forward end of the tongue 18 including guide structure (not shown) for a purpose to be hereinafter more fully set forth.

The chassis 12 includes a standpipe 20 from whose upper end a horizontally oscillatable rearwardly and upwardly directed discharge nozzle 22 is supported. The lower end of the standpipe 20 is coupled to a coupling structure 24 to which the discharge end of a high pressure water hose 26 is coupled for receiving water from the water hose 26.

The coupling structure includes internal torque developing means 27 such as that disclosed in the aforementioned U.S. Pat. No. 3,489,352 and to which the input end of a rotary output shaft 28 is operably connected. Accordingly, the rotary output shaft 28 is driven in response to the flow of water from the hose 26 into the standpipe 20.

The output end of the shaft 28 is drivingly coupled to the input shaft 30 of a gear reduction assembly 32 and the latter includes an output shaft 34 drivingly coupled, via torque transfer means 36, to a rotatably mounted winding drum 38 upon which one end of a cable 40 is wound. The other end of the cable 40 extends forwardly of the mobile irrigation device 10 and is guidingly received through the aforementioned guide structure (not shown) carried by the forward end of the tongue 18.

As water flows through the irrigation device 10 from the water hose 26 to the standpipe 20 the shaft 28 is driven and the latter in turn drives the drum 38 which winds the cable 40 thereon, the other free end of the cable being suitably anchored in the field over which the irrigation device 10 is moving to thereby enable rotation of the winding drum 38 to cause forward movement of the irrigation device 10 along the cable 40 and the end of the hose 26 remote from the coupling structure 24.

The foregoing comprises a description of conventional water pressure driven mobile irrigation devices now presently in use.

Figure 3:
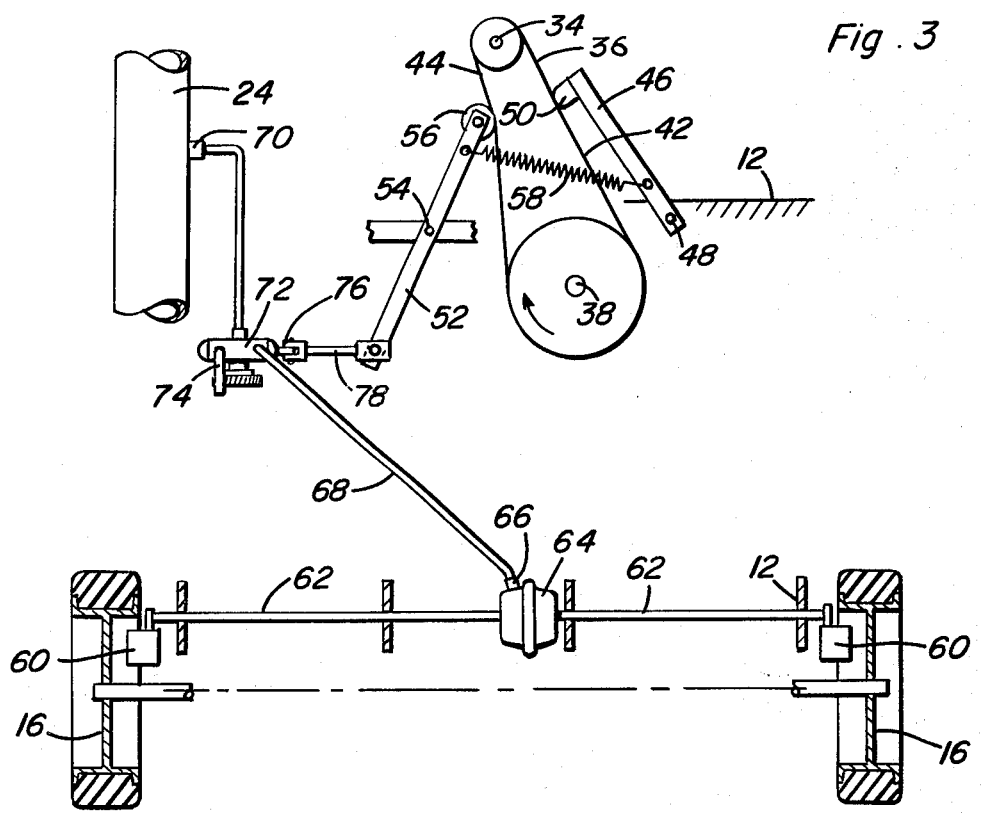
FIG. 3 is a schematic view illustrating the automatic wheel brake actuating structure of the mobile irrigation device.

With reference now more specifically to FIG. 3 of the drawings, it may be seen that the torque transfer means 36 drivingly coupling the output shaft 34 to the winding drum 38 comprises an endless flexible chain 40 including a slack reach 42 and a taut reach 44. A chain tensioner lever 46 has one end thereof pivoted to the chassis 12 as at 48 and anti-friction structure 50 on the other end thereof engaged with an intermediate portion of the slack reach 42. Further, a tension sensing lever 52 is oscillatably supported intermediate its opposite ends from the chassis 12 as at 54 and includes a roller 56 on one end engaged with the taut reach 44 of the chain 40, an expansion spring 58 being connected between the levers 46 and 52 in a manner to swing the member 50 and the roller 46 into engagement with the outer sides of the slack and taut reaches 42 and 44 of the chain 40.

A pair of brake discs 60 are supported from inversely shiftable and end aligned operating rods 62 guidingly supported from the chassis 12 for lengthwise reciprocation and the brake discs 60 are engageable with the inner sides of the wheels 16 in order to brake the latter. The adjacent ends of the rods are operably connected to a fluid pressure actuator 64 interposed therebetween and the fluid pressure actuator includes a fluid pressure inlet 66 to which one end of a high pressure fluid line 68 is connected. Upon the actuator 64 having a source of fluid pressure communicated with the inlet 66 thereof, the actuator 64 is operative to inversely shift the rod 62 relative thereto so as to cause the discs 60 to engage the wheels 16 and brake the latter. Of course, the actuator 64 includes spring means (not shown) for retracting the rods 62 away from the wheels 16 when the fluid pressure at the inlet 66 is relieved.

The end of the pressure line 68 remote from the actuator 64 is coupled to the coupling structure 24 as at 70 and the line 68 has a control valve 72 interposed therein including a bleed outlet 74. The valve 72 includes an operator 76 which is operably connected to the end of the lever 52 remote from the roller 56 by means of a connecting link 78.

The control valve 72 is constructed such that when the operator 76 is shifted to the left fluid pressure may flow through the line 68 from the coupling structure 24 to the inlet 66 of the actuator 64 and when the operator 76 is shifted to the right the flow of fluid under pressure from the coupler structure 24 through the valve 72 is blocked and that portion of the line 68 extending between the valve 72 and the inlet 66 of the actuator 64 is vented through the bleed outlet 74.

Thus, whenever the drum 38 is turning against a taut cable 40, the taut condition of the taut reach 44 of the chain 40 will maintain the valve 72 closed against the passage of high pressure water from the coupler structure 24 to the inlet 66 of the operator 64 and will vent that portion of the line 68 extending between the inlet 66 and the valve 72 through the bleed outlet 74. However, should there be any tendency of the mobile irrigation device 10 to "run ahead", the resistance to turning of the drum 38 to wind the cable 40 thereon will be reduced and the taut reach 44 will become less taut so as to allow slight clockwise angular displacement of the lever 52 as viewed in FIG. 3 of the drawings and movement of the valve operator 76 to the left in order to open the valve 72 to the passage of high pressure water from the coupling structure 24 to the brake operator 64 resulting in the brake discs 60 being displaced into engagement with the inner sides of the wheels 16.

Of course, the front wheels 14 may be braked in lieu of the rear wheels 16, or all four wheels may be braked.

Figure 4:
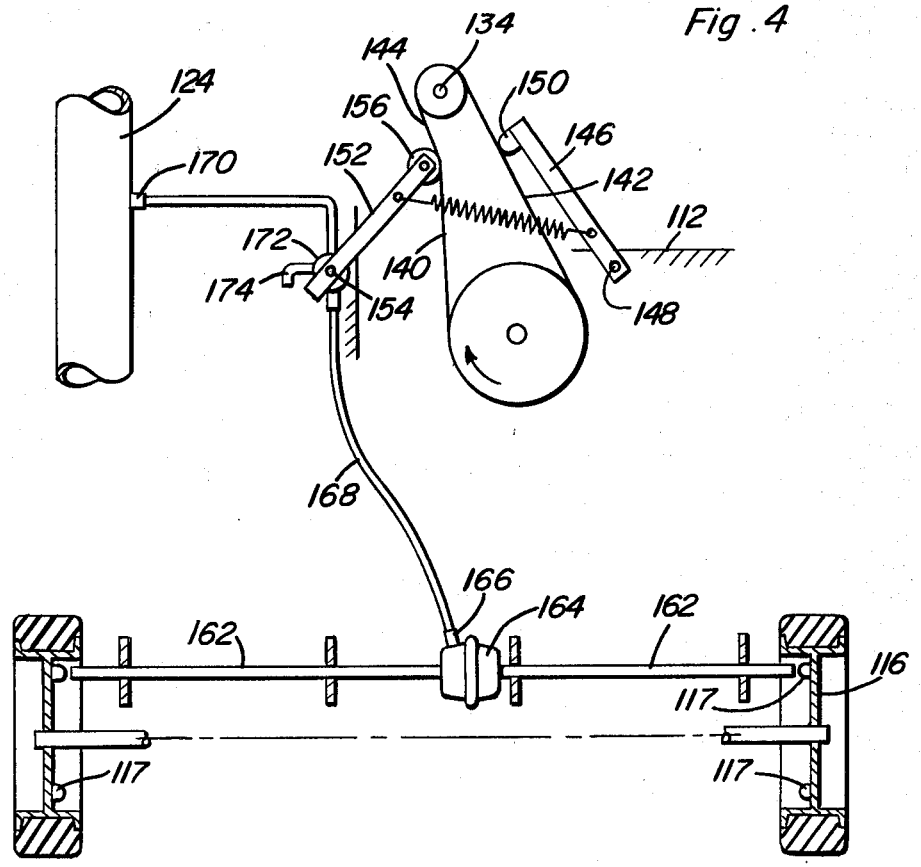
FIG. 4 is a further schematic view similar to FIG. 3 but illustrating a modified form of wheel braking structure.

With attention now invited more specifically to FIG. 4 of the drawings, a modified form of wheel braking assembly is illustrated. Substantially all of the components of the wheel braking assembly illustrated in FIG. 4 correspond to similar components of the wheel braking structure illustrated in FIG. 3 and are therefore designated by corresponding numerals in the 100 series. However, in lieu of the rods 162 of the assembly illustrated in FIG. 4 being provided with brake discs on their outer ends corresponding to the brake discs 60, the inner sides of the wheels 116 are equipped with circumferentially spaced lugs 117 directly engageable with the remote ends of the rods 62 upon actuation of the operator 164. Otherwise, the structure and operation of the brake assembly illustrated in FIG. 4 is substantially identical to the structure and operation of the brake structure illustrated in FIG. 3.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a mobile chassis provided with coupling means for coupling to a source of high pressure fluid and including rotary torque developing means having rotary power input means, supportive wheel means for said chassis including wheel brake means having fluid pressure actuatable operator means shiftable between active and inactive positions, drive means mounted on said chassis including a rotatable drive member for engaging an anchored elongated member and advancing said chassis therealong, flexive torque transfer means drivingly coupling said output means to said rotatable drive member and flexive under transfer of torque through said torque transfer means from said rotary power output means to said drive member, fluid transfer means operative to transfer fluid under pressure from said coupling means to said operator means for operation of the latter and including fluid flow control means for controlling the flow of fluid pressure through said fluid transfer means from said coupler means to said operator means, and flexure sensing means operatively associated with said torque transfer means operative to sense flexure thereof and operatively connected to said fluid flow control means for variably controlling the latter in response to variations in flexure of said torque transfer means.

2. The combination of claim 1 wherein said rotary output means and said drive member include aligned output drive and driven wheel means, said torque transfer means including an endless flexible drive member trained about said wheel means, said flexure sensing means including at least one drive member tensioning means engaged with at least one reach of said drive member to yieldingly laterally deflect and thus tension said one reach.

3. The combination of claim 2 wherein said one reach comprises the taut reach of said drive member.

4. The combination of claim 3 wherein said flexure sensing means also includes means engaged with and yieldingly laterally deflecting the slack reach of said drive member.

5. The combination of claim 1 wherein said chassis includes irrigation water discharge means supported therefrom to which said coupling means is operably coupled for delivery of water under pressure from said coupling means to said water discharge means.

6. In combination with a mobile irrigation chassis of the type including supportive wheel means, coupling means for coupling to a source of high pressure water and rotary torque developing means having rotary power output means as well as a rotatable winding member to which one end of a field anchored pull cable is attached for winding therealong for advancing said chassis along a field to be irrigated, flexive torque transfer means drivingly coupling said output means to said winding member, brake means operatively associated with said wheel means for selectively braking the latter and including oscillatable actuator means, and flexure sensing means operatively associated with said torque transfer means to sense the flexure thereof and operatively connected to said actuator means for oscillating the latter in response to variations in flexure of said torque transfer means.

7. The combination of claim 6 wherein said rotatable winding member includes rotary torque input means, said rotary power output and torque input means including aligned drive and driven wheel means, said torque transfer means including an endless flexible drive member trained about said wheel means, said flexure sensing means including at least one drive member tensioning means engaged with at least one reach of said drive member to yieldingly laterally deflect and thus tension said one reach.

8. The combination of claim 7 wherein said one reach comprises the taut reach of said drive member.

9. The combination of claim 8 wherein said flexure sensing means also include means engaged with and yieldingly laterally deflecting the slack reach of said drive member.

* * * * *